(12) United States Patent
Schmid

(10) Patent No.: US 6,543,230 B1
(45) Date of Patent: Apr. 8, 2003

(54) METHOD FOR ADJUSTING A BOOSTED INTERNAL COMBUSTION ENGINE WITH EXHAUST GAS RECIRCULATION

(75) Inventor: Wolfram Schmid, Nürtingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/806,868

(22) PCT Filed: Jun. 23, 2000

(86) PCT No.: PCT/EP00/05802

§ 371 (c)(1),
(2), (4) Date: Jun. 27, 2001

(87) PCT Pub. No.: WO01/11217

PCT Pub. Date: Feb. 15, 2001

(30) Foreign Application Priority Data

Aug. 5, 1999  (DE) .......................................... 199 36 884

(51) Int. Cl.$^7$ .............................................. F02B 33/44
(52) U.S. Cl. .................. 60/605.2; 123/568.11; 123/568.12; 123/568.17
(58) Field of Search ..................... 60/605.2; 123/568.17, 123/568.11, 568.12, 58.8

(56) References Cited

U.S. PATENT DOCUMENTS

| 4,131,095 A | * | 12/1978 | Ouchi ........................ 123/58.8 |
| 4,179,892 A | * | 12/1979 | Heydrich ................... 60/605.2 |
| 5,121,734 A |   | 6/1992  | Grieshaber et al. .... 123/568.17 |
| 5,178,119 A | * | 1/1993  | Gale ........................ 123/568.12 |
| 5,517,976 A |   | 5/1996  | Bächle et al. .......... 123/568.11 |
| 5,682,746 A |   | 11/1997 | von Hoerner ............... 60/605.2 |
| 6,009,709 A | * | 1/2000  | Bailey ..................... 123/605.2 |
| 6,138,650 A | * | 10/2000 | Bailey ..................... 123/568.11 |
| 6,141,959 A | * | 11/2000 | Digeser et al. ............... 60/274 |
| 6,286,489 B1 | * | 9/2001 | Bailey ..................... 123/568.11 |

FOREIGN PATENT DOCUMENTS

| DE | 94 21 145    |   | 6/1995  |
| DE | 195 21 573   |   | 12/1996 |
| DE | 197 30 403   |   | 10/1998 |
| DE | 198 38 725   |   | 3/2000  |
| JP | 356121853 A  | * | 9/1981  |
| JP | 08246889 A   | * | 9/1996  |
| JP | 10169513 A   | * | 6/1998  |

OTHER PUBLICATIONS

Mattes et al., "Untersuchungen zur Abgasrückführung am Hochleistungsdieselmotor", MTZ Motortechnische Zeitschrift, vol. 60 No. 4 (Apr. 1999), pp. 234–236, 238–240, 242–243 (XP 000822823).

* cited by examiner

Primary Examiner—Thomas Denion
Assistant Examiner—Thai-Ba Trieu
(74) Attorney, Agent, or Firm—Crowell & Moring LLP

(57) ABSTRACT

A method for setting a supercharged internal combustion engine having exhaust-gas recirculation in which exhaust gas is fed from an exhaust tract of the engine arranged upstream of a turbine into an intake tract of the engine arranged downstream of a compressor. The fuel quantity injected into the combustion spaces of the internal combustion engine is set in dependence on the load. To adapt the exhaust-gas recirculation to any operating point of the engine, there is a provision for recirculating exhaust gases from only some of the cylinders, which assume the function of exhaust-gas dispenser cylinders, and for setting the injection of fuel into these dispenser cylinders independently of the remaining cylinders.

7 Claims, 2 Drawing Sheets

METHOD FOR ADJUSTING A BOOSTED INTERNAL COMBUSTION ENGINE WITH EXHAUST GAS RECIRCULATION

BACKGROUND AND SUMMARY OF THE INVENTION

The invention relates to a method for setting a supercharged internal combustion engine having exhaust-gas recirculation.

In order to reduce exhaust-gas emissions, internal combustion engines were previously provided with exhaust-gas recirculation, by way of which some of the exhaust gas generated is led out of the exhaust tract back into the intake tract of the internal combustion engine. This method has proved effective, even in supercharged internal combustion engines having an exhaust-gas turbine driven by exhaust gases which are under increased exhaust-gas back pressure and actuating a compressor for compressing fresh intake air to an increased boost pressure. In supercharged internal combustion engines of this type, there is the problem that, if the recirculation line branches off upstream of the exhaust-gas turbine, exhaust-gas recirculation is possible only at operating points at which the exhaust-gas back pressure exceeds the boost pressure. However, in this case, a positive scavenging gradient with a higher pressure at the cylinder inlet than at the cylinder outlet cannot be built up.

In order to overcome this problem, it is proposed, according to German Patent Document DE 195 21 573 A1, (corresponding to U.S. Pat. No. 5,682,746) to arrange between the exhaust tract and the intake tract a non-return valve which is opened counter to a return force by means of the exhaust-gas back pressure. This ensures that the connection between the exhaust tract and the intake tract is opened only at operating points with an exhaust-gas back pressure exceeding the boost pressure and exhaust gas can flow in the direction of the intake tract as a result of the positive pressure gradient.

The disadvantage of this version is that exhaust-gas recirculation is restricted to the operating points with an exhaust-gas back pressure exceeding the boost pressure. Continuous exhaust-gas recirculation is not possible, so that the combustion air supplied to the combustion spaces contains a permanently changing oxygen content, thus making clean, low-pollutant combustion more difficult.

The present invention provides exhaust-gas recirculation for an internal combustion engine in a way adapted to each operating point, expediently as a function of the load.

According to the method of the present invention, there is provision for the exhaust gas of only some of the cylinders of the internal combustion engine, and, in particular, of only a single cylinder, to be recirculated into the intake tract. The cylinders involved in exhaust-gas recirculation are designated as exhaust-gas dispenser cylinders. By the exhaust gas being removed completely from the dispenser cylinder or dispenser cylinders, the remaining cylinders not involved in exhaust-gas recirculation can be operated with a positive scavenging gradient in which the boost pressure exceeds the exhaust-gas back pressure. As a result, the volumetric recirculation rate corresponding to the ratio of the recirculated exhaust-gas volume flow to the total exhaust-gas volume flow, remains constant over the entire characteristic map of the internal combustion engine under normal conditions with the same injection of fuel into all the cylinders. This occurs because the volumetric recirculation rate is calculated according to the ratio of the number of dispenser cylinders to the total number of cylinders, and this ratio is not changed because only the exhaust gas of the dispenser cylinders is fed into recirculation.

So that the exhaust-gas recirculation rate can be set as a function of the operating point, there is provision for manipulating the injection of fuel into the combustion spaces of in the dispenser cylinders. A doubling of the injection quantity produces double the quantity of exhaust gas in the dispenser cylinder and, correspondingly, a halving of the injection quantity likewise reduces the exhaust gas to half. The injection of fuel into the combustion spaces of the dispenser cylinders takes place independently of injection into the remaining cylinders and is set, in particular, as a function of the load, so that, in contrast to the prior art, a variably settable exhaust-gas recirculation rate can be provided, even when one exhaust-gas dispenser cylinder is used. The exhaust-gas recirculation rate can thereby be set optimally in terms of minimized exhaust-gas emission and additional boundary conditions, such as low-noise running and a high power output in the full-load range.

In a preferred embodiment, injection of fuel into the combustion spaces of the exhaust-gas dispenser cylinders takes place in dependence on the load, in that the exhaust-gas recirculation rate follows a predetermined function which can be produced, in particular, in dependence on the load and not defined volumetrically, but as a function of the $CO_2$ emission. In this case, the exhaust-gas recirculation rate is calculated from the ratio of the carbon dioxide fraction in the intake tract to the carbon dioxide fraction in the exhaust tract. The injection of fuel into the dispenser cylinders is carried out in a regulated manner in that the exhaust-gas recirculation rate follows the load-dependent predetermined profile.

The preferred profile predetermined for the exhaust-gas recirculation rate is a function which in the idling mode assumes a first minimum, in the part-load mode rises to a maximum and in the full-load mode falls to a second minimum, with the full-load minimum expediently being lower than the idling minimum. Accordingly, no or relatively little exhaust gas is recirculated into the intake tract both in the idling mode and in the full-load mode, whereas a relatively large exhaust-gas quantity is fed into the intake tract again in the part-load range. The exhaust-gas recirculation rate to be predetermined is expediently a continuous function, in particular a function which is continuous into the first derivation.

During idling, it is recommended to set the exhaust-gas recirculation rate according to the ratio of the number of dispenser cylinders to the total number of all the cylinders, this being equivalent to identical fuel injection for the dispenser cylinders and for the remaining cylinders. Uniform vibration distribution and low-noise running are thereby achieved in the idling mode or in the no-load mode.

Under full load, it may be advisable to set the exhaust-gas recirculation rate to half the value of the ratio of the number of dispenser cylinders to the total number of all the cylinders by the injection quantity for the dispenser cylinders being reduced to half the injection quantity of the remaining cylinders. The reduction in the exhaust-gas recirculation rate under full load improves the emission behaviour and increases engine power, possible non-uniformities in running due to the unequal injection of fuel into the dispenser cylinders and the remaining cylinders because of the increased vibration level in the full-load range being negligible since they cannot be detected or can be only slightly detected subjectively.

Other objects, advantages and novel features of the present invention will become apparent from the following detailed description of the invention when considered in conjunction with the accompanying drawings.

DETAILED DESCRIPTION OF THE DRAWINGS

Figure 1:
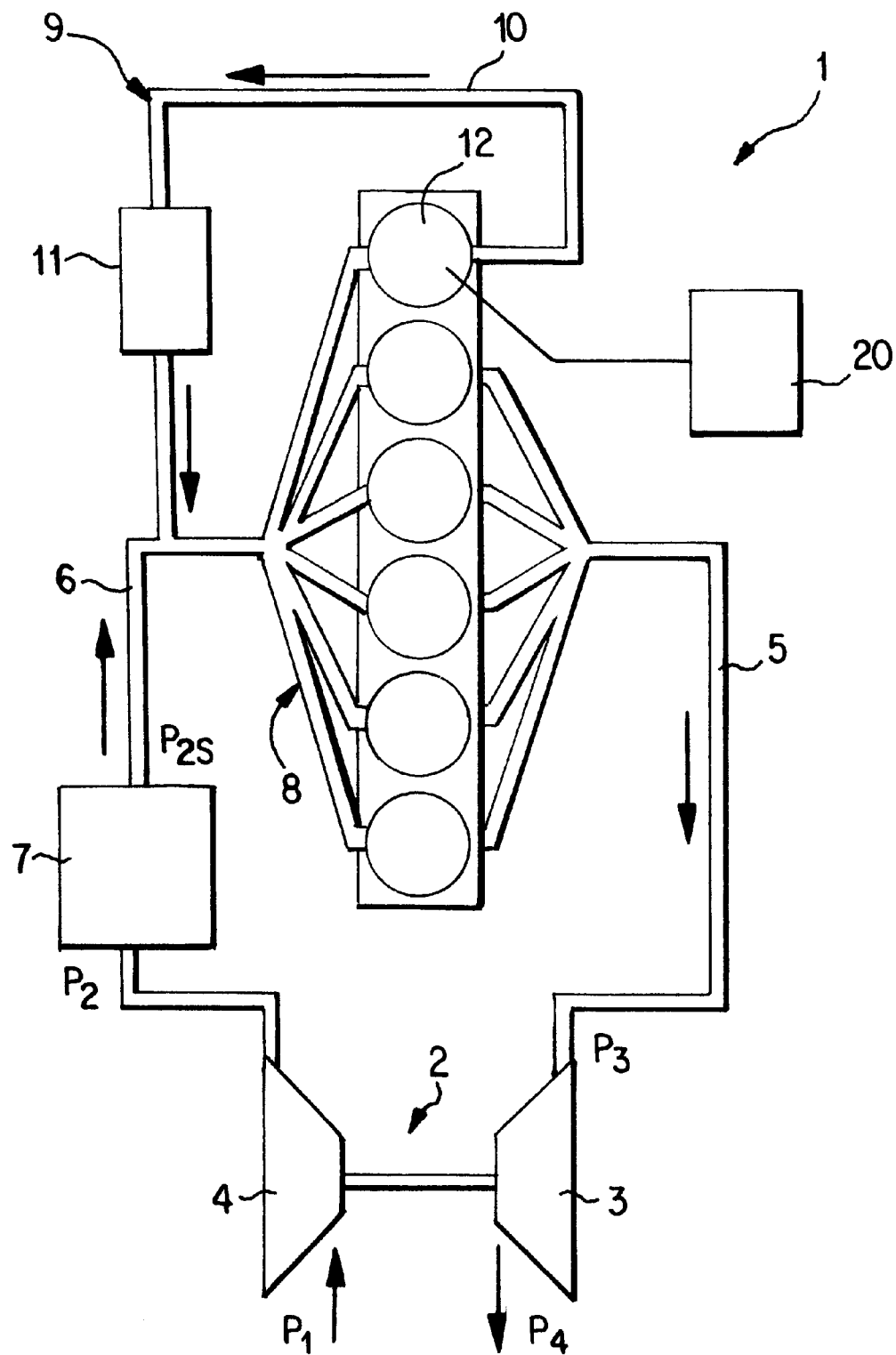
FIG. 1 shows a diagrammatic view of a six-cylinder internal combustion engine with a single dispenser cylinder for exhaust-gas recirculation.

The internal combustion engine 1 illustrated in FIG. 1 has an exhaust-gas turbocharger 2 with a turbine 3 in the exhaust tract 5 and a compressor 4 in the intake tract 6. The exhaust gases in the exhaust tract 5, which are under the exhaust-gas back pressure $p_3$, drive the turbine 3 and are discharged into the atmosphere, after catalytic purification, at a relieved pressure $p_4$. The turbine 3 drives the compressor 4 which compresses fresh intake air arriving at atmospheric pressure $P_1$ to an increased pressure $P_2$. The compressed air is cooled in a charge-air cooler 7 arranged in the intake tract 6 and is subsequently supplied at a boost pressure $P_{2s}$ to the cylinder inlets 8 of the internal combustion engine.

The internal combustion engine 1 is provided with exhaust-gas recirculation 9 via which some of the exhaust gas occurring in the internal combustion engine 1 in the combustion mode is fed into the intake tract 6 and mixed with the fresh air in the intake tract 6. The exhaust-gas recirculation 9 comprises an exhaust-gas recirculation line 10 which branches off at the cylinder outlet and opens into the intake tract 6 downstream of the compressor 4 and downstream of the charge-air cooler 7. An exhaust-gas recirculation cooler 11 is arranged in the exhaust-gas recirculation line 10 for cooling the recirculated exhaust gases.

Only the exhaust gases from a single cylinder 12 of the internal combustion engine 1 are recirculated into the intake tract 6 via the exhaust-gas recirculation 9. For this purpose, the exhaust-gas recirculation line 10 is connected to the cylinder outlet of the cylinder 12 which has the function of an exhaust-gas dispenser cylinder, such that all the exhaust gases from the dispenser cylinder 12 are recirculated at all the operating points of the internal combustion engine 1. By contrast, the exhaust gases from the remaining cylinders of the internal combustion engine 1 do not participate in the exhaust-gas recirculation, but instead are discharged into the atmosphere via the exhaust tract 5 and the turbine 3 arranged in the exhaust tract 5. The exhaust-gas recirculation rate determined on the basis of volume remains constant in the standard situation where there are equal injection quantities into all the cylinders over all the operating points of the internal combustion engine 1. Therefore, the exhaust gas recirculation rate determined on the basis of volume corresponds to the ratio of the number of dispenser cylinders to the total number of all the cylinders of the internal combustion engine 1, one sixth in the exemplary embodiment.

In order to describe the combustion behavior of the internal combustion engine and the generation of emissions, an exhaust-gas recirculation rate EGR is defined on the basis of $CO_2$ emissions according to the relation:

$$EGR = CO_{2,\ intake} / CO_{2,\ exhaust\ gas}$$

which defines the ratio of the carbon dioxide fraction $CO_{2,\ intake}$ in the intake tract 6 to the carbon dioxide fraction $CO^2_{,\ exhaust\ gas}$ in the exhaust tract 5. The $CO_2$ exhaust-gas recirculation rate can be manipulated, independently of the volumetric exhaust-gas recirculation rate, by the injection of fuel into the dispenser cylinder 12. In this manner, the fuel quantity supplied to the dispenser cylinder 12 is increased or reduced to a different extent in relation to the fuel quantities supplied to the remaining cylinders. For example, an increase in the injection quantity raises the exhaust-gas recirculation rate EGR, in particular proportionally, while a reduction in the injection quantity lowers the exhaust-gas recirculation rate EGR, in particular proportionally. Thus, it is possible, by the control of the injection quantity, to set a desired exhaust-gas recirculation rate for every operating point of the internal combustion engine, in particular for every load situation.

The regulation or control of the injected fuel quantity is carried out by a regulating and control unit 20 of the internal combustion engine 1 as a function of current state and operating variables of the internal combustion engine 1 according to stored characteristic maps.

The advantage of focusing on injection in the dispenser cylinder 12 is that a variable exhaust-gas recirculation rate can be set. At the same time, the turbocharger 2 may be designed in such a way that a positive scavenging gradient with a boost pressure $P_{2s}$ exceeding the exhaust-gas back pressure $p_3$ is established. The control of the injection quantity into the dispenser cylinder 12 may be carried out under the control of the characteristic maps and is capable of being executed with a high degree of accuracy. It is sufficient to determine the carbon dioxide fraction by sensor; furthermore, there is no need for any further sensor signals.

Fuel injection is carried out in such a way that the exhaust-gas recirculation rate corresponds to a predetermined load-dependent function. To achieve operational characteristics of the internal combustion engine which are optimized in terms of consumption, comfort and exhaust-gas emission, it is provided that the desired exhaust-gas recirculation rate assumes a minimum in the idling mode, rises to a maximum with an increase in load in the part-load mode and finally falls again in the full-load mode to a minimum which may differ from the idling minimum.

Figure 2:
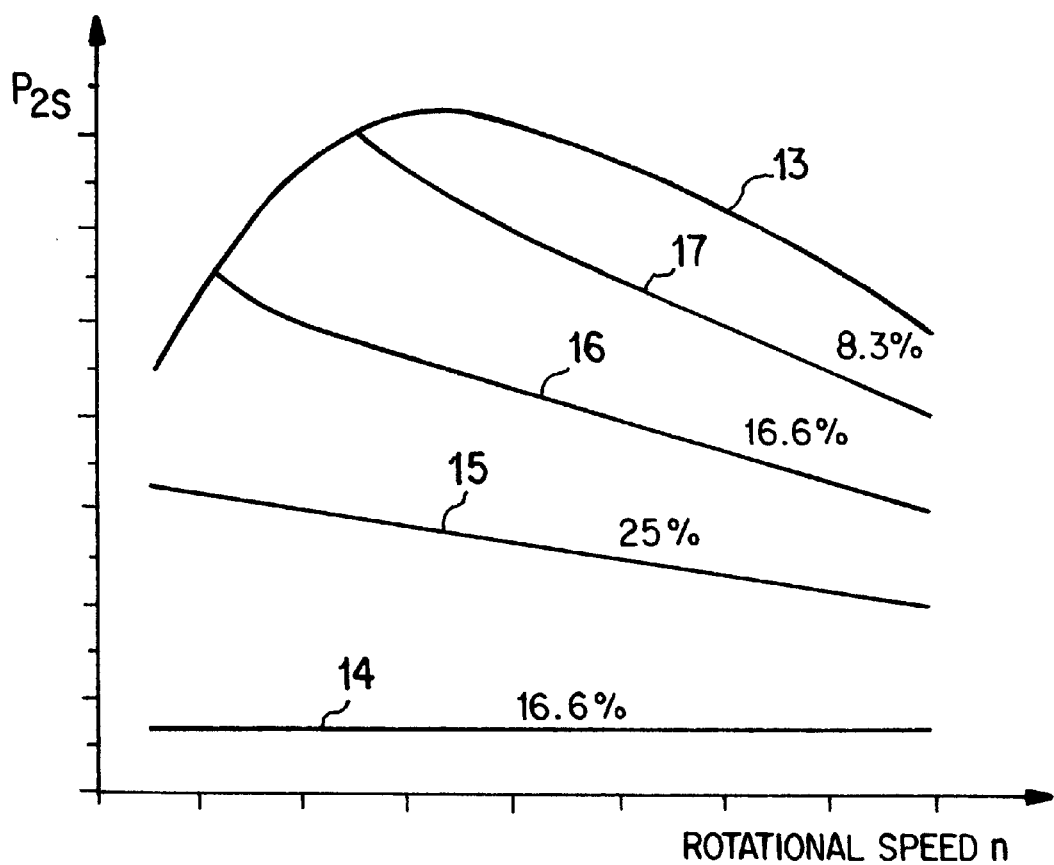
FIG. 2 shows a graph with several lines having different exhaust-gas recirculation rates as a function of the rotational speed and of the boost pressure.

The graph according to FIG. 2 illustrates various pressure lines for the boost pressure $P_{2s}$ as a function of the engine rotational speed n, said pressure lines extending as far as a limiting curve 13 illustrating the profile of the maximum permissible load-dependent boost pressure which can be implemented without the risk of component damage. Below the limiting curve 13 are illustrated four different curve profiles 14, 15, 16, 17 which each represent a different boost pressure $P_{2s}$, the load rising with an increasing boost pressure $P_{2s}$. Each curve profile is assigned in each case an exhaust-gas recirculation rate EGR of the dispenser cylinder 12. The lowest curve profile 14 illustrates the situation in the idling mode or in the no-load mode, in which a constant low boost pressure $P_{2s}$ prevails. In the exemplary embodiment of a six-cylinder engine, as shown, the exhaust-gas recirculation rate EGR is exactly 16⅔% at this operating point, corresponding to the ratio of the number of dispenser cylinders to the total number of all cylinders. This ratio is achieved for the situation where the fuel quantity supplied to the dispenser cylinder 12 is exactly the same as the fuel quantity supplied in each case to the remaining cylinders. As a result, in the idling mode or in the no-load mode, a dynamic vibration unbalance is avoided and low-noise running is improved.

The next higher curve profile 15 illustrates the situation in the lower part-load range in which a higher exhaust-gas recirculation rate EGR is desired. In this range, the exhaust-gas recirculation rate EGR rises to a maximum which is around 25% in the exemplary embodiment and is therefore higher by half than in the idling mode. With the load increasing further, the exhaust-gas recirculation rate EGR falls again according to the curve profiles 16, 17 and, in the full-load range represented by the curve profile 17, assumes an absolute minimum which, in the exemplary embodiment, at 8.3% is half the value of the idling exhaust-gas recirculation rate.

The control or regulation of the exhaust-gas recirculation rate is preferably carried out by the setting of the time and duration of fuel injection. It may, however, be expedient, if appropriate, for the exhaust-gas recirculation rate also to be influenced by a manipulation of the ignition timing.

The method or the device illustrated is advantageously suitable for use in multi-cylinder diesel engines, but may also be implemented, furthermore, in gas engines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for setting a supercharged internal combustion engine having exhaust-gas recirculation, the supercharged internal combustion engine comprising a plurality of cylinders and an exhaust-gas recirculation device capable of recirculating an exhaust gas from an exhaust tract of the engine arranged upstream of a turbine into an intake tract of the engine arranged downstream of a compressor comprising:

injecting a quantity of fuel into a plurality of cylinders of the internal combustion engine in dependence on engine load;

recirculating a portion of the exhaust gas from at least one cylinder which operates as an exhaust-gas dispenser cylinder into the intake tract;

independently setting the quantity of fuel injected into the at least one exhaust-gas dispenser cylinder, wherein the quantity of fuel injected into the at least one exhaust-gas dispenser cylinder is determined in dependence on the engine load such that an exhaust-gas recirculation rate (EGR) follows a predetermined function, the exhaust-gas recirculation rate (EGR) being defined by:

$$EGR = CO_{2,\ intake} / CO_{2,\ exhaust\ gas}$$

wherein $CO_{2,\ intake}$ corresponds to a carbon dioxide fraction in the intake tract and $CO_{2,\ exhaust\ gas}$ corresponds to a carbon dioxide fraction in the exhaust tract.

2. The method according to claim 1, wherein the exhaust-gas recirculation rate (EGR) assumes a minimum in an idling mode of the supercharged internal combustion engine.

3. The method according to claim 1, wherein the exhaust-gas recirculation rate (EGR) assumes a maximum in a part-load mode of the supercharged internal combustion engine.

4. The method according to claim 1, wherein the exhaust-gas recirculation rate (EGR) assumes a minimum in a full-load mode of the supercharged internal combustion engine.

5. The method according to claim 1, wherein the exhaust-gas recirculation rate (EGR) is increased by increasing the quantity of fuel injected into the at least one exhaust-gas dispenser cylinder relative to the quantity of fuel injected into the remaining cylinders, and the exhaust-gas recirculation rate (EGR) is lowered by decreasing the quantity of fuel injected into the at least one exhaust-gas dispenser cylinder relative to the fuel quantity injected into the remaining cylinders.

6. The method according to claim 1 wherein the exhaust-gas recirculation rate (EGR) is set during an idling mode of the supercharged internal combustion engine according to a ratio of a total number of exhaust-gas dispenser cylinders to a total number of all of the cylinders of the internal combustion engine.

7. The method according to claim 1, wherein the exhaust-gas recirculation rate (EGR) is set during a full-load mode of the supercharged internal combustion engine to half a value of a ratio of the number of exhaust-gas dispenser cylinders to a total number of all of the cylinders of the internal combustion engine.

* * * * *